(12) United States Patent
Glejbol

(10) Patent No.: US 10,113,673 B2
(45) Date of Patent: Oct. 30, 2018

(54) REINFORCEMENT ELEMENT FOR AN UNBONDED FLEXIBLE PIPE

(71) Applicant: National Oilwell Varco Denmark I/S, Brondby (DK)

(72) Inventor: Kristian Glejbol, Glostrup (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 514 days.

(21) Appl. No.: 14/384,215

(22) PCT Filed: Mar. 12, 2013

(86) PCT No.: PCT/DK2013/050063
§ 371 (c)(1),
(2) Date: Sep. 10, 2014

(87) PCT Pub. No.: WO2013/135243
PCT Pub. Date: Sep. 19, 2013

(65) Prior Publication Data
US 2015/0027580 A1    Jan. 29, 2015

(30) Foreign Application Priority Data

Mar. 13, 2012 (DK) .................. 2012 00185

(51) Int. Cl.
*F16L 11/00* (2006.01)
*F16L 11/08* (2006.01)
(Continued)

(52) U.S. Cl.
CPC .............. *F16L 11/083* (2013.01); *B32B 1/00* (2013.01); *B32B 5/26* (2013.01); *B32B 37/24* (2013.01);
(Continued)

(58) Field of Classification Search
CPC .................................. F16L 11/083; B32B 1/00
(Continued)

(56) References Cited

U.S. PATENT DOCUMENTS 3,311,133 A    3/1967  Kinander
3,687,169 A    8/1972  Reynard
(Continued)

FOREIGN PATENT DOCUMENTS

GB    1 404 394 A    3/1972
GB    2 330 394 A    4/1999
(Continued)

OTHER PUBLICATIONS

Supplementary European Search Report issued in Application No. EP 13 76 0484 dated Oct. 20, 2015.
(Continued)

*Primary Examiner* — Vishal Pancholi
(74) *Attorney, Agent, or Firm* — Pearne & Gordon LLP

(57) ABSTRACT

The invention relates to an elongate reinforcement element for reinforcing an unbonded flexible pipe, a method of producing the elongate reinforcement element and an unbonded flexible pipe comprising the elongate reinforcement element. The reinforcement element comprises a plurality of elongate armor strips and an elongate support element comprising a channel, wherein the plurality of elongate armor strips are arranged in the channel of the elongate support element. Preferably the elongate armor strips are arranged to be superimposed in the channel and the plurality of superimposed elongate armor strips are displaceable in relation to each other upon bending of the elongate reinforcement element.

24 Claims, 11 Drawing Sheets

(51) Int. Cl.
*B32B 1/00* (2006.01)
*B32B 5/26* (2006.01)
*B32B 37/24* (2006.01)

(52) U.S. Cl.
CPC ....... *B32B 2260/00* (2013.01); *B32B 2597/00* (2013.01); *Y10T 156/10* (2015.01); *Y10T 428/24248* (2015.01)

(58) Field of Classification Search
USPC .................. 138/129, 132, 133, 137, 139
See application file for complete search history.

(56) References Cited

U.S. PATENT DOCUMENTS

| | | | |
|---|---|---|---|
| 3,858,616 | A | 1/1975 | Thiery et al. |
| 4,549,581 | A | 10/1985 | Unno et al. |
| 4,706,713 | A | 11/1987 | Sadamitsu et al. |
| 5,064,491 | A | 11/1991 | Huvey |
| 5,213,637 | A | 5/1993 | Mallen Herrero et al. |
| 5,407,744 | A | 4/1995 | Mallen Herrero et al. |
| 5,487,261 | A | 1/1996 | Varga |
| 5,601,893 | A | 2/1997 | Strassel et al. |
| 5,645,109 | A | 7/1997 | Herrero et al. |
| 5,669,420 | A | 9/1997 | Herrero et al. |
| 5,730,188 | A | 3/1998 | Kalman et al. |
| 5,780,075 | A | 7/1998 | Huvey |
| 5,813,439 | A | 9/1998 | Herrero et al. |
| 5,837,083 | A | 11/1998 | Booth |
| 5,922,149 | A | 7/1999 | Mallen Herrero et al. |
| 5,996,641 | A | 12/1999 | Chen |
| 6,016,847 | A | 1/2000 | Jung et al. |
| 6,065,501 | A | 5/2000 | Feret et al. |
| 6,085,799 | A | 7/2000 | Kodaissi et al. |
| 6,123,114 | A | 9/2000 | Seguin et al. |
| 6,145,546 | A | 11/2000 | Hardy et al. |
| 6,165,586 | A | 12/2000 | Nouveau et al. |
| 6,192,941 | B1 | 2/2001 | Mallen-Herrero et al. |
| 6,253,793 | B1 | 7/2001 | Dupoiron et al. |
| 6,283,161 | B1 | 9/2001 | Feret et al. |
| 6,291,079 | B1 | 9/2001 | Mallen Herrero et al. |
| 6,354,333 | B1 | 3/2002 | Dupoiron et al. |
| 6,382,681 | B1 | 5/2002 | Berton et al. |
| 6,390,141 | B1 | 5/2002 | Fisher et al. |
| 6,408,891 | B1 | 6/2002 | Jung et al. |
| 6,415,825 | B1 | 7/2002 | Dupoiron et al. |
| 6,454,897 | B1 | 9/2002 | Morand |
| 6,516,833 | B1 | 2/2003 | Witz et al. |
| 6,668,867 | B2 | 12/2003 | Espinasse et al. |
| 6,691,743 | B2 | 2/2004 | Espinasse |
| 6,739,355 | B2 | 5/2004 | Glejbøl et al. |
| 6,840,286 | B2 | 1/2005 | Espinasse et al. |
| 6,889,717 | B2 | 5/2005 | Coutarel et al. |
| 6,889,718 | B2 | 5/2005 | Glejbøl et al. |
| 6,904,939 | B2 | 6/2005 | Jung et al. |
| 6,978,806 | B2 | 12/2005 | Glejbol et al. |
| 6,981,526 | B2 | 1/2006 | Glejbol et al. |
| 7,032,623 | B2 | 4/2006 | Averbuch et al. |
| 7,311,123 | B2 | 12/2007 | Espinasse et al. |
| 7,487,803 | B2 | 2/2009 | Lokere et al. |
| 7,842,149 | B2 | 11/2010 | Glejbøl et al. |
| 2003/0102044 | A1 | 6/2003 | Coutarel et al. |
| 2010/0101675 | A1 | 4/2010 | Do et al. |

FOREIGN PATENT DOCUMENTS

| | | | |
|---|---|---|---|
| WO | 95/20698 | A1 | 8/1995 |
| WO | 00/66927 | A1 | 11/2000 |
| WO | 01/51839 | A1 | 7/2001 |
| WO | 01/61232 | A1 | 8/2001 |
| WO | 2008/025893 | A1 | 3/2008 |
| WO | 2008/077409 | A1 | 7/2008 |
| WO | 2008/077410 | A1 | 7/2008 |
| WO | 2009/024156 | A2 | 2/2009 |
| WO | 2012/092931 | A1 | 7/2012 |
| WO | 2012/149937 | A1 | 11/2012 |
| WO | 2012/155910 | A1 | 11/2012 |
| WO | 2013/071935 | A1 | 5/2013 |

OTHER PUBLICATIONS

DK PA 2011 00334 application dated May 2, 2011, corresponding to WO 2012/149937.
DK PA 2011 00371 application dated May 13, 2011, Corresponding to WO 2012/155910.
"Recommended Practice for Flexible Pipe"; ANSI/API Recommended Practice 17B; Fourth Edition; Jul. 2008; pp. 1-213.
"Specification for Unbonded Flexible Pipe"; ANSI/API Specification 17J; Third Edition; Jul. 2008; pp. 1-73.

REINFORCEMENT ELEMENT FOR AN UNBONDED FLEXIBLE PIPE

TECHNICAL FIELD

The invention relates to a reinforcement element for an unbonded flexible pipe, a method of producing it as well as an unbonded flexible pipe comprising such reinforcement element, in particular a unbonded flexible pipe for offshore and subsea transportation of fluids like hydrocarbons, $CO_2$, water and mixtures hereof/or for an umbilical.

BACKGROUND ART

Flexible unbonded pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. Such pipes usually comprise an innermost liner also often called an inner sealing sheath or an inner sheath, which forms a barrier against the outflow of the fluid which is conveyed in the bore of the pipe, and one or more armor layers. In general flexible pipes are expected to have a lifetime of 20 years in operation.

Examples of unbonded flexible pipes are e.g. disclosed in WO0161232A1, U.S. Pat. No. 6,123,114 and U.S. Pat. No. 6,085,799.

The term "unbonded" means in this text that at least two of the layers including the armor layers and polymer layers are not bonded to each other. In practice the known pipe normally comprises at least two armor layers located outside the innermost sealing sheath and optionally an armor structure located inside the innermost sealing sheath normally referred to as a carcass.

These armor layers comprise or consist of multiple elongated armor elements that are not bonded to each other directly or indirectly via other layers along the pipe. Thereby the pipe becomes bendable and sufficiently flexible to roll up for transportation.

In traditional flexible pipes the armor layers often comprise metallic armor layers including a pressure armor layer of helically wound wires and cross-wound tensile armor layers of wires wound with a lower angle.

In the prior art it has been suggested to replace one or more of the metallic armor layers with armor layers of fibres or fibre reinforced polymer of different structures. U.S. Pat. No. 6,165,586 for example discloses a strip of filamentary rovings of glass fibre or aramid fibre sampled with bonding material and retaining means. It is suggested to use such strips to replace one or more metallic armor layers of an unbonded flexible pipe.

WO 01/51839 discloses a flexible unbonded pipe comprising a tensile armor layer of aramid fibres embedded in a thermoplastic material.

U.S. Pat. No. 7,842,149 discloses a method of manufacturing a precursor for a reinforcement element for a flexible pipeline. One or more precursors are thereafter laminated with each other and/or other strength-imparting layer or layers to form a final reinforcement element. This provides the advantage that the individual strength-imparting layers in the reinforcement element may be manufactured as an independent product which may be stored and later be included in the manufacture of a reinforcement element for a flexible pipeline.

In the production of a pipe with the reinforcement element of U.S. Pat. No. 7,842,149, the reinforcement layer is composed by applying a number of strength-imparting layers with a coating of thermoplastic polymer to the pipe. Immediately prior to winding on the pipe, the strength-imparting layers are heated, causing the applied thermoplastic polymer to melt. Thereby the strength-imparting layers fuse to a unit. Since this fusion takes place immediately prior to the application to the pipe, the thermoplastic polymer will be molten during the winding, but will harden immediately after the application to the pipe. As a result, after solidification the applied element will essentially have a shape that ensures a low level of residual stress in the strength-imparting layers and that the unit formed by the strength imparting layers has either the final helical shape or a shape which will allow for final deformation to helical shape with only moderate extra force.

DISCLOSURE OF INVENTION

The object of the invention is to provide an elongate reinforcement element for a flexible unbonded pipe, which elongate reinforcement element can be of a composite material and which is relatively simple to handle in the production of the unbonded flexible pipe. Further it is an object of the invention to provide an elongate reinforcement element for a flexible unbonded pipe, which elongate reinforcement element has a high resistance against wear.

It is also an object of the invention to provide a method of producing such elongate reinforcement element as well as to provide a flexible unbonded pipe comprising such elongate reinforcement element.

These objects have been achieved by the present invention as defined in the claims.

The elongate reinforcement element of the invention and embodiments thereof have shown to have a large number of advantages which will be clear to the skilled person from the following description.

The terms "reinforcement element" and "armor element" are used interchangeably herein.

The elongate reinforcement element of the invention is in particular suitable for reinforcing an unbonded flexible pipe of the type described above, where the elongate reinforcement element can be applied in replacement of the armor wires of prior art unbonded flexible pipes.

The reinforcement element of the invention comprises a plurality of elongate armor strips and an elongate support element comprising a channel, wherein the plurality of elongate armor strips are arranged in the channel of the elongate support element.

The reinforcement element of the invention has shown to be very simple to handle in the production of an unbonded flexible pipe, and in particular the reinforcement element of the invention makes it very cost effective to apply the reinforcement layer in situations where several elongate armor strips are to be applied. This is usually the case when using composite elongate armor strips in order to avoid or reduce formation of residual stress in such composite elongate armor strips when the reinforcement element is helically wound onto a pipe.

The reinforcement element of the invention further has shown to have a high resistance against wear.

The term "elongate armor strips" is herein used to designate any elongate armor elements which have a small dimension of about 5 mm or less, where the small dimension is determined perpendicular to the elongate axis of the elongate strip. Usually the small dimension of the elongate armor strip is equal to the thickness of the strip.

The elongate armor strips are preferably in the form of substantially flat tapes, however, as it will be described in the following the elongate armor strips can have any other shapes, such as round, oval or angular.

Unless other is specified it is generally preferred in all the below embodiments that the elongate armor strips are in form of tapes.

Furthermore it is preferred that the elongate armor strips are superimposed e.g. in the form of one or more stacks of elongate armor tapes.

The elongate armor strips are for example flat rectangular tapes; polygonal e.g. with one or more rounded corners, or they are basically round or hexagonal and are for example arranged in a twisted manner inside the channel.

In the following the term 'tapes' should be taken to mean substantially flat tapes, where the term "substantially" is used to include minor variations that are within the ordinary production tolerances.

The elongate armor strips can be any kind of strip with a suitable tensile strength, such as metal strips, fibre reinforced polymer strips or combinations thereof.

Generally it is desired that at least one of the elongate armor strips is of a composite material.

The elongate armor strips can for example be as the strips described in U.S. Pat. No. 6,165,586, in WO 01/51839 and/or in U.S. Pat. No. 7,842,149.

In an embodiment of the invention, the elongate armor strips are in form of superimposed elongate armor strips.

In an embodiment of the invention, the elongate armor strips are in form of superimposed elongate armor tapes.

The reinforcement element of the invention is in particular beneficial in situations where the superimposed elongate armor strips comprise composite elongate armor strips. The term "composite elongate armor strips" means herein a reinforced polymer strip.

The composite elongate armor strips are preferably composite elongate armor tapes.

In a preferred embodiment the composite elongate armor strips comprise fibres embedded in a polymer matrix.

By including fibre reinforced composite elongate armor strips in the reinforcement element of the present invention a particularly strong and durable reinforcement element can be obtained. The composite elongate armor strips are protected by the elongate support element and thereby they have a high resistance against wear.

In an embodiment of the invention, the elongate reinforcement element comprises composite elongate armor strips of fibres embedded in an at least partly cured polymer matrix. In principle the polymer matrix can be any kind of partly cured polymer matrix. In an embodiment of the invention the polymer matrix is at least about 50% cured. Preferably polymer matrix is at least about 70% cured, such as at least about 80% cured, such as at least about 90% cured, such as substantially fully cured.

The term "substantially" should herein be taken to mean that ordinary product variances and tolerances are comprised.

In an embodiment of the invention, the polymer matrix of the composite elongate armor strips comprises a thermoset polymer, preferably selected from epoxy resins, vinyl-epoxy-ester resins, polyester resins, polyimide resins, bismaleimide resins, cyanate ester resins, vinyl resins, benzoxazine resins, benzocyclobutene resins, or mixtures comprising at least one of the forgoing thermoset polymers.

In an embodiment of the invention, the polymer matrix of the composite elongate armor strips comprises a thermoplastic polymer, such as polyolefin, polyamide, polyimide, polyamide-imide, polyester, polyurethane, polyacrylate or mixtures comprising at least one of the forgoing thermoplastic polymers.

The fibre reinforced composite elongate armor strips in the reinforcement element of the present invention can be reinforced with any type of fibres. Preferably the composite elongate armor strips, comprises fibres selected from basalt fibres, polypropylene fibres, carbon fibres, glass fibres, aramid fibres, steel fibres, polyethylene fibres, mineral fibres and/or mixtures comprising at least one of the foregoing fibres.

Fibre reinforced composite elongate armor strips preferably comprise at least about least 10% by weight of fibres, such as from about 20% to about 90% by weight of fibres.

Generally fibres have a low weight relative to their strength and even though the tensile strength of the elongate support element is relatively low, the resulting tensile strength of the reinforcement element can be very high.

Preferably the fibres of the fibre reinforced composite elongate armor strips comprise or consist of basalt fibres.

In particular the basalt fibres have a very low weight relative to their strength and by using basalt fibres a reinforcement element with a very high tensile strength can be obtained.

In an embodiment of the invention, the fibres comprise one or more cut fibres and/or filaments. The cut fibres and/or filaments may e.g. be in the form of strands comprising at least one cut fibres and/or filaments, yarns comprising at least one of the cut fibres and/or filaments, rovings comprising at least one of the cut fibres and/or filaments, and/or fibre bundles comprising at least one of the cut fibres and/or filaments. In an embodiment of the invention the fibres comprise a fibre bundle comprising spun, knitted, woven, braided fibres and/or are in the form of a regular or irregular network of fibres and/or a fibre bundle cut from one or more of the foregoing.

The longitudinal direction of the reinforcement element and its elements including its elongate armor strips and elongate support element has a longitudinal direction which is the direction along the length of their elongation when the reinforcement element is applied in a straight position. The longitudinal direction is also called the longitudinal direction along the channel.

In an embodiment of the invention the composite elongate armor strips have a longitudinal direction along the channel and the predominant amount by weight of the fibres are orientated in the longitudinal direction of the composite elongate armor strips, preferably at least about 60% by weight, such as at least about 70% by weight, such as at least about 80% by weight, such as at least about 90% by weight, such as substantially all of the fibres are orientated in the longitudinal direction of the composite elongate armor strips.

A fibre is determined to be oriented in the longitudinal direction of the composite elongate armor strips when its general orientation angle to the longitudinal direction is about 25 degrees or less.

The term "substantially all" means herein that a minor amount such as up to about 2% or less of the basalt fibres can be arranged in another direction.

When the basalt fibres are arranged in a direction predominantly parallel to the elongate direction of the fibre containing elongate armor element, the tensile strength of the fibre containing elongate armor in the length direction thereof is very high.

The term "cut fibres" means herein fibres of non continuous length, e.g. in the form of chopped fibres or melt blown fibres. The cut fibres are usually relatively short fibres e.g. less than about 5 cm, such as from about 1 mm to about 3 cm in length. The cut fibres may have equal or different lengths.

Filaments are continuous single fibre (also called monofilaments).

The phrase "continuous" as used herein in connection with fibres, filaments, strands or rovings means that the fibres, filaments, strands, yarns or rovings means that they generally have a significant length but should not be understood to mean that the length is perpetual or infinite. Continuous fibres, such as continuous filaments, strands, yarns or rovings preferably have length of at least about 10 m, preferably at least about 100 m, more preferably at least about 1000 m.

The term "strand" is used to designate an untwisted bundle of filaments.

The term "yarn" is used to designate a twisted bundle of filaments and/or cut fibres. Yarn includes threads and ropes. The yarn may be a primary yarn made directly from filaments and/or cut fibres or a secondary yarn made from yarns and/or cords. Secondary yarns are also referred to as cords.

The term "roving" is used to designate an untwisted bundle of strands or yarns. A roving includes a strand of more than two filaments. A non-twisted bundle of more than two filaments is accordingly both a strand and a roving.

In an embodiment of the invention the major amount, preferably at least about 60% by weight, more preferably substantially all of the fibres are in the form of continuous fibres, such as continuous filaments, continuous yarns, continuous rovings or combinations thereof.

In an embodiment of the invention, the elongate armor strips are superimposed and consist of composite elongate armor strips optionally with intermediate non-armoring strips, such as strips of thermoplastic polymer, the thermoplastic polymer is optionally a cross-linkable polymer. As mentioned above, the superimposed elongate armor strips are preferably in the form of superimposed elongate armor tapes.

In a preferred embodiment the elongate armor strips are as the elongate armor element shaped as tapes as described in co-pending DK PA 2011 00334 and DK PA 2011 00371.

In order to provide a reinforcement element which can be helically wound in the production of an unbonded flexible pipe without significant mechanical residual stresses occurring in the reinforcement element after it is wound, it is desired that the plurality of elongate armor strips are displaceable in relation to each other i.e. that they can slide in relation to each other upon bending of the elongate reinforcement element. In an embodiment of the invention, where the elongate armor strips in the form of tapes are superimposed, the elongate armor strips are displaceable in relation to each other. After the reinforcement element has been applied to the unbonded flexible pipe, the elongate armor strips can be fixed to each other, if desired.

In an embodiment of the invention, two or more of the superimposed elongate armor strips are not bonded to each other. Thereby a high degree of displaceability of the elongate armor strips in relation to each other is obtained.

In an embodiment of the invention, none of the superimposed elongate armor strips are bonded to each other.

The term "bonded" means bonded in substantially all of the interface of the bonded elements, i.e. a fully face to face bonding.

In an embodiment of the invention, two or more of the superimposed elongate armor strips are not fixed to each other, preferably none of the superimposed elongate armor strips are fixed to each other.

The term "fixed to each other" in relation to the superimposed elongate armor strips means fixed in discrete points or areas to each other.

In order to provide a high integration of the elements of the reinforcement element it is desired in an embodiment that the elongate armor strips are bonded or fixed to each other or that they are prepared to be bonded or fixed to each other after having been applied to an unbonded flexible pipe. It has been found that when the elongate armor strips are bonded or fixed to each other, the total tensile strength can be increased above the sum of the tensile strength of the individual elements. Further it has been found that the bonding or fixing of the elongate armor strips to each other, when the reinforcement elements are applied in an unbonded flexible pipe, provides a reinforcing element which is relatively simple to handling when using it in production of an unbonded flexible pipe.

In an embodiment of the invention, two or more of the optionally superimposed elongate armor strips are fixed or bonded to each other or they are prepared to be fixed or bonded to each other by a thermoplastic material.

The phrase "prepared to be fixed or bonded to each other" should herein be taken to mean that the elongate armor strips are configured with the material for fixing or bonding to each other but where the material has not yet been activated to result in the fixing or bonding.

In an embodiment of the invention, all of the optionally superimposed elongate armor strips are fixed or bonded to each other by a thermoplastic material.

In an embodiment of the invention, all of the superimposed elongate armor strips are prepared to be fixed or bonded to each other by a thermoplastic material, i.e. upon heating e.g. by irradiation of the thermoplastic material the fixing or bonding will be effected. This can beneficially be performed after the reinforcement element has been helically wound.

In an embodiment of the invention, two or more of the superimposed elongate armor strips are bonded or are prepared to be bonded to each other by a thermoplastic part of the elongate armor strips, preferably by a coating on one or more of the superimposed elongate armor strips.

In an embodiment of the invention two or more of the superimposed elongate armor strips are bonded or are prepared to be bonded to each other by one or more strips of thermoplastic material applied between the elongate armor strips.

In an embodiment of the invention, two or more of the superimposed elongate armor strips are fixed or are prepared to be fixed to each other by an adhesive applied between the elongate armor strips. The adhesive may e.g. be a heat and/or radiation activated.

In an embodiment of the invention, two or more of the optionally superimposed elongate armor strips are mechanically fixed to each other e.g. by a binding material, by rivets or similar.

The respective armor strips may in principle have any length, width and thickness. The length of the elongate armor strips is determined along their longitudinal direction.

In an embodiment of the invention, the width of the respective armor strips of the superimposed elongate armor strips is substantially identical.

The width to thickness dimension of the respective armor strips in the form of tapes preferably is from about 500:1 to about 2:1, such as from about 100:1 to about 5:1.

A width of the elongate armor strips is preferably in the interval from about 2 mm to about 25 mm.

In one embodiment the fibre containing elongate armor element has a width of from about 2 mm to about 20 cm, such as from about 3 mm to about 10 cm, such as from about 5 mm to about 5 cm, such as from about 8 mm to about 2 cm.

Preferably the thickness of the respective elongate armor strips is about 5 mm or less, preferably from about 0.1 mm to about 5 mm, e.g. 1-2 mm.

In embodiments where the elongate armor strips are not tapes the thickness is determined as the smallest dimension perpendicular to the elongate axis of the respective elongate armor strip and the width is determined perpendicular to the thickness and the elongate axis. In embodiments where the elongate armor strips have a round or oval cross section, the thickness is determined to be the diameter or the smaller diameter if it is oval.

The elongate armor strips of a reinforcement element may have equal or different shape(s).

In an embodiment of the invention, the elongate armor strips have a round or oval cross section with a diameter from about 0.1 mm to about 5 mm, such as from about 0.5 mm to about 1 mm.

The elongate armor strips of a reinforcement element may have equal or different thicknesses. For simple production it is desired that the elongate armor strips have substantially equal thicknesses.

The elongate support element will preferably have one channel, but although not preferred it could also have two or more channels.

The channel of the elongate support element comprises a bottom section with an inner bottom surface and two opposite side sections with inner side surfaces: The channel has a width parallel to the width of the armor strips and a height perpendicular to the width of the armor strips. Preferably the height of the channel is at least about the sum of the thickness of the superimposed elongate armor strips, such that all of the elongate armor strips are contained in the channel.

In an embodiment the width of the channel is larger than the width(s) of the armor strips of the superimposed elongate armor strips such that the elongate armor strips can be applied in the channel in a simple manner, e.g. in the form or one or more stacks.

In an embodiment the inner bottom surface and optionally the inner side surfaces are covered with a metal layer forming a lining. The lining is preferably of a duplex metal such as LDX 2001 (UNS S32101), Duplex 2005 (UNS S32205) or 316L (UNS S31603) market by Outokumpu.

The lining is preferably adhered to the inner bottom surface and optionally the inner side surfaces e.g. by an adhesive. The metal lining can have any desired thickness typically up to about 2 mm e.g. from 0.1 to 1 mm. The lining can be used to heat the armor strip, e.g. to ensure a desired curing of composite elongate armor strips in the channel. In an embodiment the lining is adapted to be used for heating to ensure that the temperature of the fluid in the bore of the pipe is not dropping to a level where precipitation of paraffin and/or flocculation of asphaltenes in the hydrocarbons transported in the pipe occur. By providing the heating via the lining the applied heat can be applied over a large surface to the reinforcing element and according any risk of local overheating can be avoided while simultaneously applying a substantially amount of heat to the pipe.

The metal lining further provides a gas barrier against penetrating of gasses which has passes from the bore and through the innermost sealing sheath.

In an embodiment of the invention, where the elongate armor strips are tapes it is generally desired that the width of the channel is less than 25% larger than the width(s) of the armor strips, and preferably the width of the channel is less than 10% larger than the width(s) of the armor strips.

In an embodiment of the invention, the elongate armor strips form together a strip assembly and the strip assembly has a width which is determined in the width direction of the channel. The width of the channel is preferably selected such that it is less than 25% larger than the width of the strip assembly.

In an embodiment of the invention, the width of the channel and the width(s) of the armor strips of the superimposed elongate armor strips are selected such that at least one of the armor strips is withheld in the channel. Preferably at least the armor strips farthest from the inner bottom surface is withheld in the channel, thereby providing a lid function. In an embodiment of the invention, two or more, such as all of the superimposed elongate armor strips are withheld in the channel.

In an embodiment of the invention, the width of the channel varies continuously or in one or more steps with the distance from the inner bottom surface. Preferably the inner side surface(s) of one or both of the opposite side sections is/are provided with protrusions, such as grooves, flanges and/or peaks, which protrusions are configured to withhold at least one of the armor strips in the channel.

In an embodiment of the invention, the width of the channel is substantially equal in the whole height of the channel.

In an embodiment of the invention, at least one of the armor strips is/are withheld in the channel by being in tension between the inner side surfaces of the opposite side sections.

The elongate support element is preferably of polymer material.

For simple and cost effective production it is preferred that the elongate support element is of an extrudable polymer material and that the elongate support element is an extruded elongate support element.

In an embodiment of the invention, the elongate support element is of a polymer material comprising polyolefins, e.g. polyethylene or poly propylene; polyamide, e.g. poly amide-imide, polyamide-11 (PA-11), polyamide-12 (PA-12) or polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS); polyacrylates; polyethylene terephthalate (PET); polyether-ether-ketones (PEEK); polyvinyls; polyacrylonitrils; polyetherketoneketone (PEKK); copolymers of the preceding; fluorous polymers e.g. polyvinylidene diflouride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; compounds comprising one or more of the above mentioned polymers, and composite materials.

The elongate support element is in an embodiment of a fibre reinforced polymer material. For example the elongate support element can be a composite elongate support element of one or more of the above mentioned polymers compounded with fibres. The fibres of the elongate support element are preferably cut fibres. The cut fibres are preferably random in direction or slightly oriented due to extruding of the elongate support element.

In an embodiment of the invention, the elongate support element is of an elastomer material. It has been found that the choice of an elastomer elongate support element adds to the good resistance against wear and ensures a reinforcement element which is cost-effective in the production of the unbonded flexible pipe.

In an embodiment of the invention, the elongate reinforcement element has a longitudinal direction along its elongation, and the elongate support element has a tensile strength in the longitudinal direction which is less than the average tensile strength of the superimposed elongate armor strips.

In an embodiment of the invention, the reinforcement element further comprises a lid for the elongate support element. The lid is preferably fixed or bonded to the elongate support element to fully or partly encase the superimposed elongate armor strips. In an embodiment of the invention, the elongate support element and/or the lid is/are of a thermoplastic material and the elongate support element and the lid are bonded by applying heat.

In an embodiment of the invention, the lid extends in the whole length of the elongate support element.

In an embodiment of the invention, the lid is in the form of a plurality of sections applied with distances along the length of the elongate support element.

The invention also comprises a method of producing the elongate reinforcement element as described above.

The method of the invention comprises
  providing an elongate support element with a length, the elongate support element comprising a channel along its length;
  providing a plurality of elongate armor strips; and
  applying the plurality of elongate armor strips in the channel of the elongate support elements, preferably such that the plurality of armor strips are superimposed in the channel.

The elongate support element and the elongate armor strips are as described above.

In a preferred embodiment the elongate support element is produced by extrusion.

In a preferred embodiment the superimposed elongate armor strips comprise composite elongate armor strips of fibres embedded in a polymer matrix, and the method comprises embedding the fibres in the polymer matrix, preferably by a pultrusion process.

The elongate armor strips may be applied in the elongate support element by any method.

In an embodiment of the invention the plurality of elongate armor strips are applied in the channel of the elongate support element by simultaneously applying the elongate armor strips in a stack in the channel. The elongate armor strips may e.g. be stacked prior to the application in the elongate support element.

In an embodiment of the invention the plurality of elongate armor strips are applied in the channel of the elongate support element by one-by-one applying the elongate armor strips in the channel.

In an embodiment of the invention the plurality of elongate armor strips are applied in the channel immediately prior to helically winding of the reinforcement element.

In an embodiment of the invention the plurality of elongate armor strips are applied in the channel after the elongate support element has been helically wound.

In an embodiment of the invention the elongate armor strips are in the form of strip layers which may extend along the whole or a part of the channel of the elongate support element.

The elongate armor strips are preferably in the form of strip layers extending substantially in the whole length of the channel of the elongate support element.

The respective strip layers can be provided in one section or in several sections applied in extension of each other.

It is desirable in one embodiment to apply elongate armor strip layers which in one section extend the whole length of the reinforcement element. An elongate reinforcement element of the invention comprising one or more elongate armor strip layers of one-section-strip layers will be relatively strong because the full strength of the individual elongate armor strips is utilized.

Since the reinforcement element usually is very long, it may be desired or even required in an embodiment to apply the elongate armor strips layers such that the respective strip layers are applied in two or more sections each.

In an embodiment of the invention, the method comprises applying the elongate armor strip sections in extension of each other, thereby providing a strip replacement location where each elongate armor strip section replaces another by being applied in extension thereof.

In a preferred embodiment, the strip replacement locations of the elongate armor strip layers are displaced with respect to each other along the length of the elongate reinforcement element. By applying the strip replacement locations of the elongate armor strips displaced with respect to each other along the length of the elongate reinforcement element, the minimum tensile strength of the reinforcement element will be the strength of the sum of strength of the elongate armor strips minus the strongest of the elongate armor strips. If the elongate armor strips are identical and there are n elongate armor strips with the tensile strength Y, the minimum tensile strength of the reinforcement element will be $Y*(n-1)$.

The elongate armor strip sections are of a non-infinite length meaning herein that the elongate armor strip sections are shorter than the channel of the elongate reinforcement element, i.e. the respective elongate armor strip sections do not extend in the whole length of the elongate reinforcement element and several elongate armor strip sections are needed to provide a whole elongate armor strip In an embodiment of the invention, the elongate armor strip sections applied in extension of each other are not fixed directly to each other. They may be indirectly connected by fixing or bonding of the elongate armor strip layers to each other.

In an embodiment of the invention, the plurality of elongate armor strips are applied in a stack in the channel directly in contact with each other.

In an embodiment of the invention, the plurality of elongate armor strips are applied in a stack in the channel with intermediate non-armor strips, such as strips of thermoplastic polymer, the thermoplastic polymer is optionally a cross-linkable polymer.

In an embodiment of the invention, the plurality of elongate armor strips are applied in a stack in the channel with thermoplastic material in interfaces of the respective elongate armor strips e.g. provided by a thermoplastic part of the elongate armor strips or by intermediate thermoplastic material. The method optionally comprises heating the stack of elongate armor strips to soften the thermoplastic material to bond the elongate armor strips to each other.

In an embodiment of the invention, the method further comprises providing a lid for the elongate support element, and preferably fixing or bonding the lid to the elongate support element to fully or partly encase the superimposed elongate armor strips.

The invention also comprises an unbonded flexible pipe wherein the unbonded flexible pipe comprises an innermost sealing sheath defining a bore and a length axis of the pipe and at least one armor layer comprising at least one helically wound elongate reinforcement element comprising a plurality of superimposed elongate armor strips and an elongate support element comprising a channel, wherein the plurality of elongate armor strips are arranged in the channel of the elongate support element.

The elongate reinforcement element is preferably as described above.

In an embodiment of the invention, the unbonded flexible pipe comprises a pressure armor layer comprising said elongate reinforcement element(s), the elongate reinforcement element(s) being helically wound with a winding angle to the length axis of the pipe which is about 70 degrees or more.

The helically wound elongate reinforcement element(s) provides consecutive reinforcement element windings. If desired, adjacent reinforcement element windings may be interconnected, e.g. by an interconnecting element or interconnecting elements.

In an embodiment of the invention, the unbonded flexible pipe comprises at least one tensile armor layer comprising said elongate reinforcement element(s), the elongate reinforcement element(s) preferably being helically wound with a winding angle to the length axis of the pipe which is about 45 degrees or less.

In an embodiment of the invention, the unbonded flexible pipe comprises at least one balanced armor layer comprising said elongate reinforcement element(s), the elongate reinforcement element(s) preferably being helically wound with a winding angle to the length axis of the pipe which is from about 50 to about 60 degrees.

In an embodiment of the invention, the at least one tensile armor layer comprises a plurality of said elongate reinforcement elements, the tensile armor layer further comprises at least one elongate blind element, the elongate reinforcement elements and the at least one elongate blind element being helically wound in a side-by-side relation.

This embodiment is in particularly preferred in embodiments where each elongate armor strip comprises two or more elongate armor strip sections in extension of each other and the strip replacement locations of the elongate armor strip layers are displaced with respect to each other along the length of the elongate reinforcement element. In this way the total tensile strength required in a tensile armor layer can be provided with less elongate armor strips than if the tensile armor layer did not comprise any elongate blind element. The reason for this can be explained with the example above where the minimum tensile strength of a reinforcement element was calculated to be $Y*(n-1)$, where Y is the tensile strength of each elongate armor strip and n is the number of elongate armor strips. From this it can be seen that for each reinforcement element the tensile strength of one elongate armor strip is not fully utilized. Accordingly, the lower the number of reinforcement elements the less not fully utilized tensile strength. However, in order to have a relatively evenly distributed tensile strength in the whole tensile armor layer, the number of elongate blind elements should preferably not be too high, e.g. the number of elongate blind elements should preferably be less than the number of reinforcement elements, more preferably less than half the number of reinforcement elements In an embodiment of the invention, the at least one tensile armor layer comprises a plurality of said elongate blind element, said elongate blind element preferably being evenly distributed between the elongate armor strips of the tensile armor layer.

The elongate blind element(s) has/have preferably an outer shape which is substantially identical to said elongate armor strips. In an embodiment of the invention, the elongate blind element(s) is/are provided by elongate support element(s) without armor strips. The elongate blind element(s) may provide a maintaining passage as described in co-pending PCT/DK2012/050002.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

All features of the inventions including ranges and preferred ranges can be combined in various ways within the scope of the invention, unless there are specific reasons not to combine such features.

BRIEF DESCRIPTION OF DRAWINGS

The invention will be explained more fully below in connection with a preferred embodiment and with reference to the drawings in which.

The figures are schematic and simplified for clarity, and they show only details which are essential to the understanding of the invention, while other details are left out. Throughout, the same reference numerals are used for identical or corresponding parts.

Figure 1:
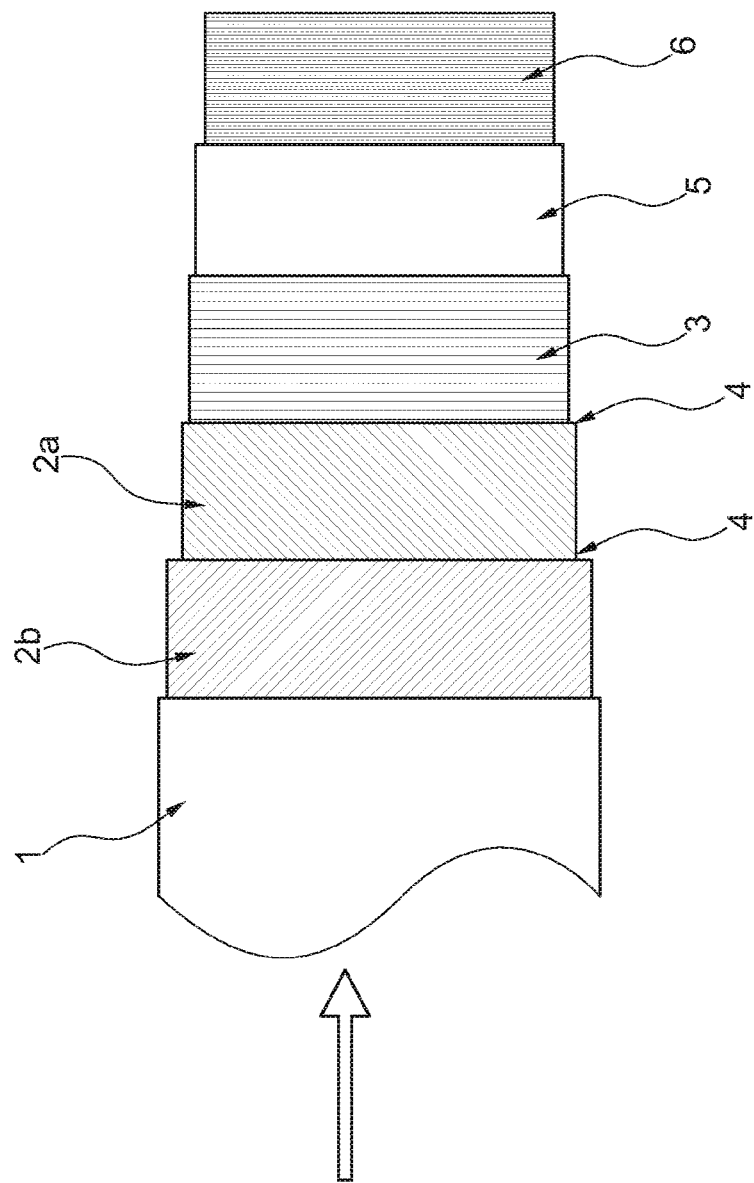
FIG. 1 is a schematic side view of a flexible armored pipe of the invention.

The flexible pipe shown in FIG. 1 comprises an innermost sealing sheath 5, often also called an inner liner, e.g. of high density poly ethylene (HDPE), cross linked polyethylene (PEX), Polyvinyldifluorid (PVDF) or polyamide (PA). The innermost sealing sheath has the purpose of preventing outflow of the fluid transferred in the bore of the pipe, indicated with the arrow. Inside the innermost sealing sheath 5 the pipe comprises an inner armor layer 6, called a carcass which is normally of metal, and has the main purpose of reinforcing the pipe against collapse as described above. The unbonded flexible pipe of the invention can also be provided without a carcass as described above. The carcass 6 is not liquid tight.

On the outer side of the innermost sealing sheath 5, the flexible pipe comprises a pressure armor layer 3, which is often of helically wound armor element(s) of metal or composite material or combinations, which is wound with an angle to the axis of the pipe of about 65 degrees or more e.g. about 85 degrees. The pressure armor layer 3 is not liquid tight.

Outside the pressure armor layer 3, the pipe comprises two cross wound tensile armor layers 2a, 2b wound from elongate armor elements. The elongate armor elements on the innermost tensile armor layer 2a are wound with a winding degree of about 55 degrees or less to the axis of the pipe in a first winding direction and the outermost tensile armor layer 2b is wound with a winding degree of about 60 degrees or less, such as between about 20 and about 55 degrees to the axis of the pipe in a second winding direction, which is the opposite direction to the first winding direction. The two armor layers with such opposite winding directions are normally referred to as being cross wound. The pipe further comprises an outer sealing sheath 1 protecting the armor layer mechanically and against ingress of sea water. As indicated with the reference number 4, the unbonded flexible pipe preferably comprises anti-friction layers between the armor layers 3, 2a, 2b. The anti-friction layers are usually not liquid tight and may for example be in the form of a wound film.

Figure 2:
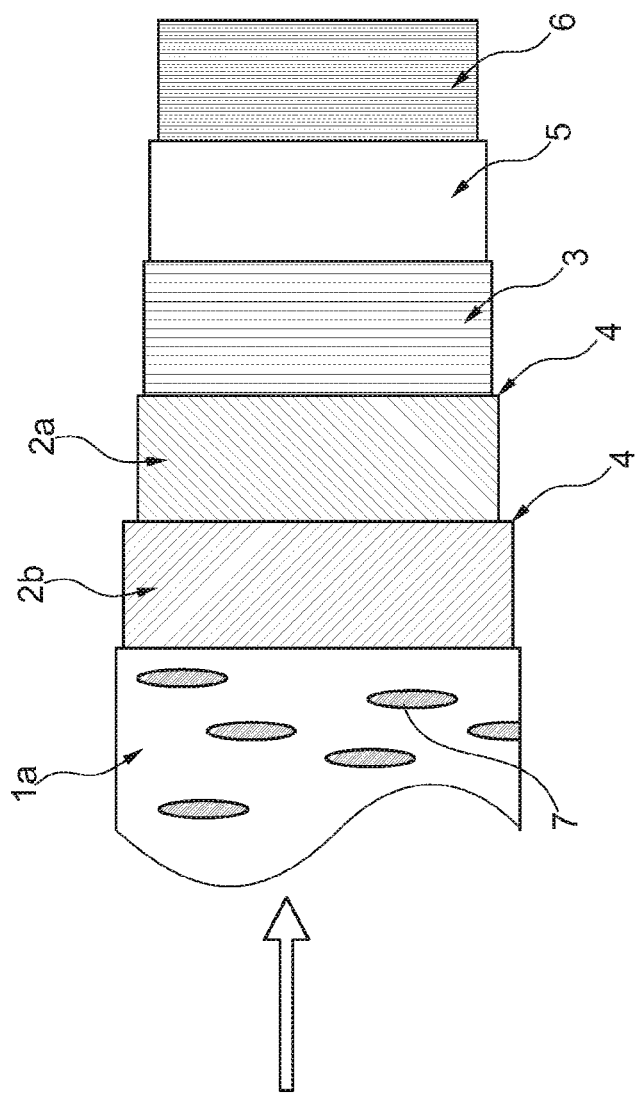
FIG. 2 is a schematic side view of a variation of the flexible armored pipe shown in FIG. 1.

FIG. 2 shows a variation of the flexible armored pipe shown in FIG. 1 where the outer sealing sheath 1 has been replaced with an outer perforated and non-liquid tight mechanical protective outer sheath.

At least one of the armor layers comprises an elongate reinforcement element of the invention as described below.

Preferably one or both of the tensile armor layers 2a, 2b consist of a plurality elongate reinforcement elements of the invention optionally with intermediate elongate blind elements as described herein.

The pipe of the invention may have more or less layers than the pipes of FIGS. 1 and 2, and some layers may be replaced by other layers provided that the pipe comprises at least one armor layer comprising at least one elongate reinforcement element of the invention. For example the pipe may comprise additional polymer layer or layers—often called intermediate sealing sheath. Such additional polymer layer or layers may be applied between the respective armor layers. For example the pipe may comprise insulating layer or layers e.g. applied between the outermost tensile armor layer and the outer sheath. The type of layers and order of layers may e.g. be as described in documents GB 1 404 394, U.S. Pat. No. 3,311,133, U.S. Pat. No. 3,687,169, U.S. Pat. No. 3,858,616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813,439, U.S. Pat. No. 5,837,083, U.S. Pat. No. 5,922,149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390,141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978,806, U.S. Pat. No. 6,981,526, U.S. Pat. No. 7,032,623, U.S. Pat. No. 7,311,123, U.S. Pat. No. 7,487,803, US 23102044, WO 28025893, WO 2009024156, WO 2008077410 and/or WO 2008077409, as well as in Specification for Unbonded Flexible Pipe, API, 17J, Third edition, July 2008 and/or in Recommended Practice for Flexible Pipe, API, 17B, Fourth edition, July 2008, provided that at least one armor layer is a displacement reduced armor layer as described herein.

Figure 3:
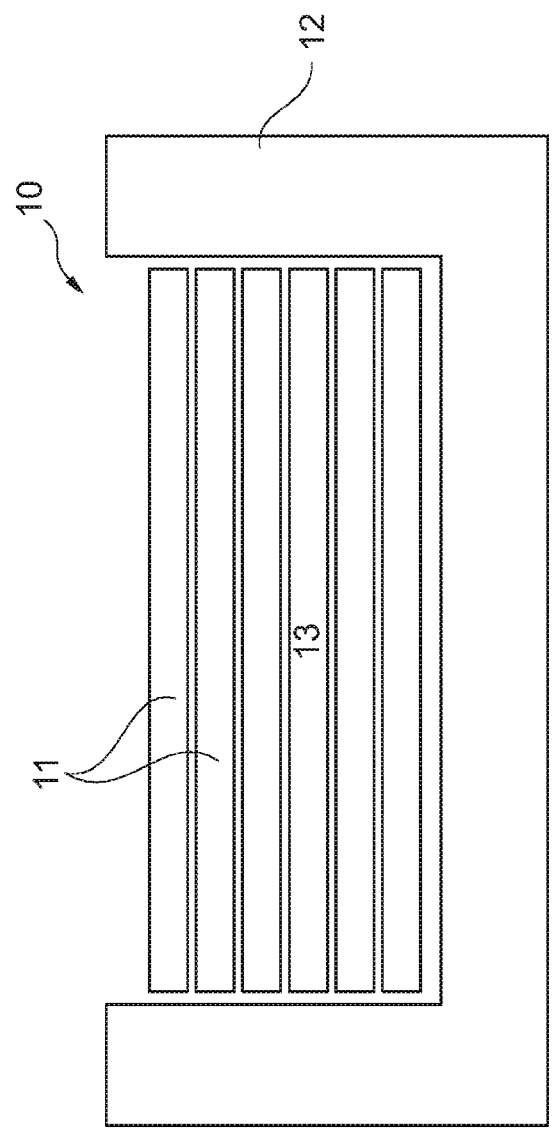
FIG. 3 is a cross-sectional view of an elongate reinforcement element of the invention comprising superimposed elongate armor strips in the form of tapes.

FIG. 3 is a cross-sectional view of an elongate reinforcement element 10 of the invention. The cross-sectional view is taken in a plane perpendicular to the elongate length of the elongate reinforcement element. The elongate reinforcement element comprises a plurality of elongate armor strips 11 and an elongate support element 12 comprising a channel 13, and the plurality of elongate armor strips 11 are arranged in the channel 13 of the elongate support element 12. The elongate armor strips are arranged to be superimposed in the channel i.e. to lie partly or fully above each other. In the shown embodiment the superimposed elongate armor strips 11 are in the form of tapes applied in a stack, such that they fit into the cavity 13 of the support element 12.

The superimposed elongate armor strips 11 may e.g. be coated with a thermoplastic material as described above or in an alternative embodiment not shown strips of thermoplastic material are applied between the superimposed elongate armor strips 11.

Figure 4:
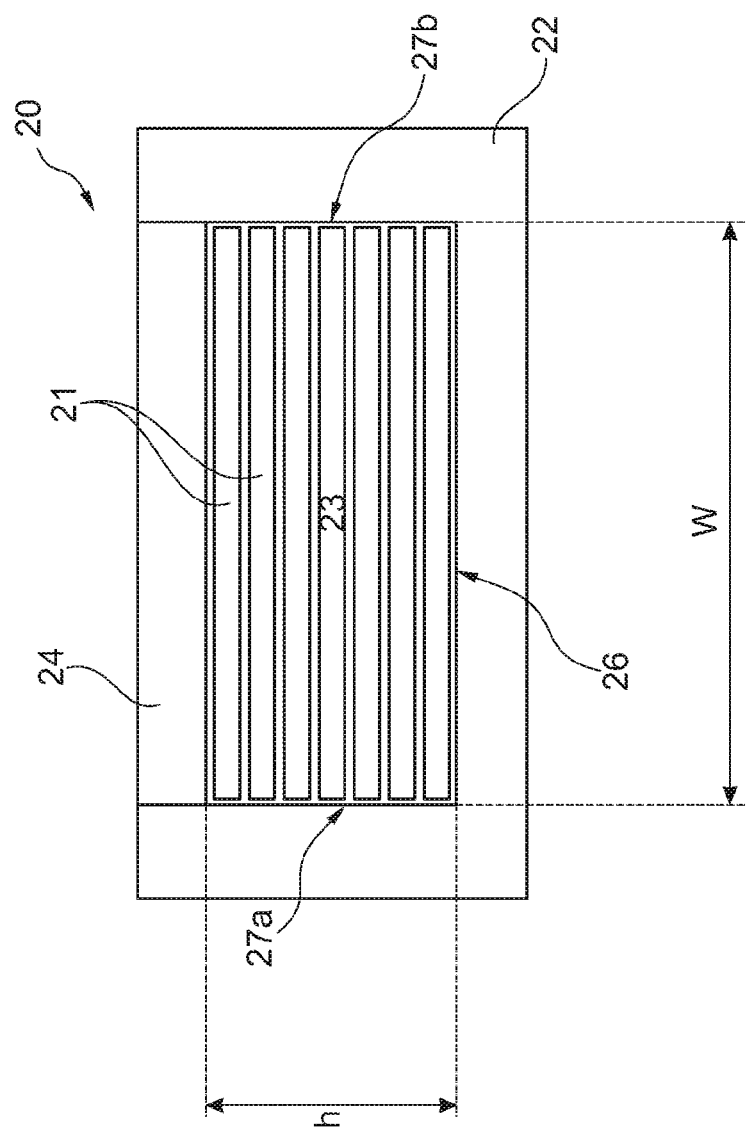
FIG. 4 is a cross-sectional view of another elongate reinforcement element of the invention comprising a lid.

The elongate reinforcement element 20 shown in FIG. 4 comprises a plurality of superimposed elongate armor tapes 21 and an elongate support element 22 comprising a channel 23, and the plurality of superimposed elongate armor tapes 21 are arranged in the channel 23 of the elongate support element 22. The elongate reinforcement element 20 further comprises a lid 24 for the elongate support element 22. The lid 24 is applied to fully or partly encase the plurality of superimposed elongate armor strips in the channel 23. The lid 24 is preferably fixed to the elongate support element 22 with an adhesive fixation as indicated with the reference number 25.

The channel 23 of the elongate support element comprises a bottom section with an inner bottom surface 26 and two opposite side sections with inner side surfaces 27a, 27b, the channel has a width W parallel to the width of the armor strips and a height h perpendicular to the width of the armor strips.

Figure 5:
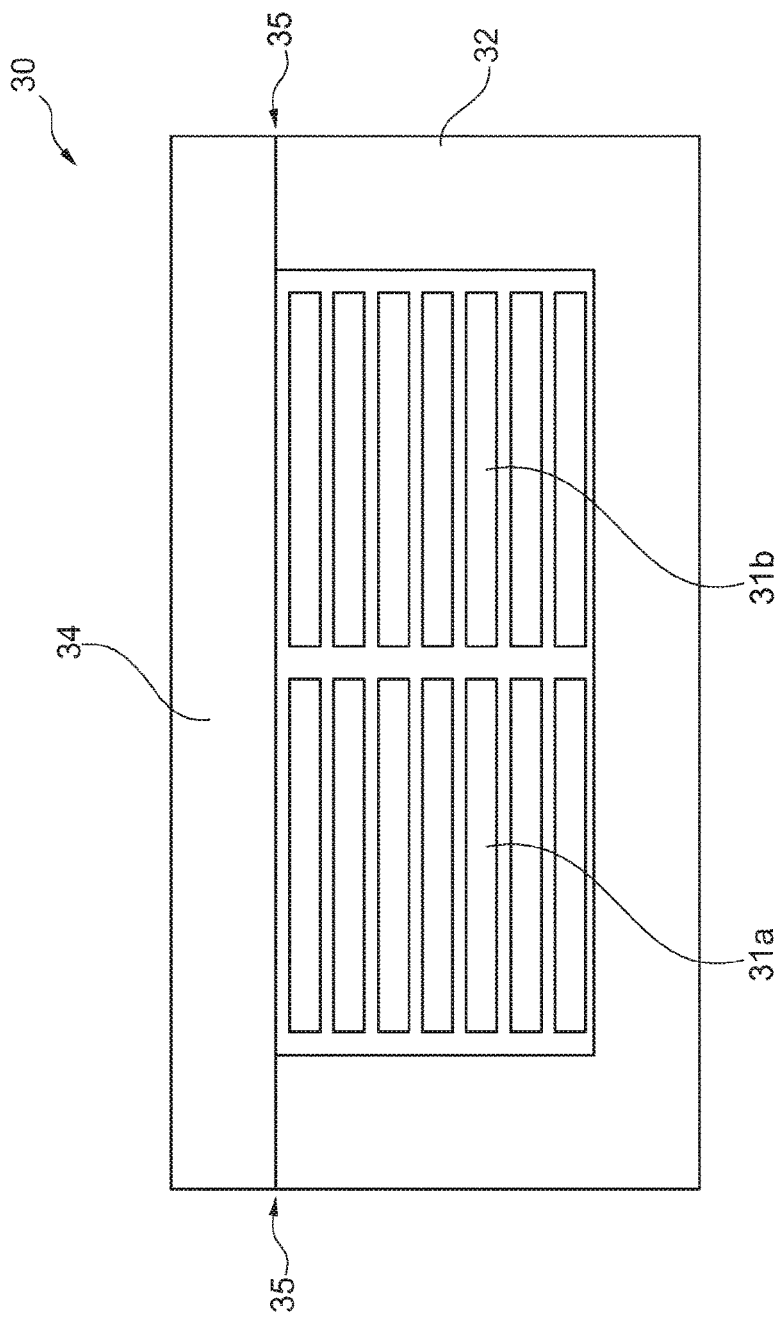
FIG. 5 is a cross-sectional view of yet another elongate reinforcement element of the invention comprising two stacks of superimposed elongate armor strips and a lid.

The elongate reinforcement element 30 shown in FIG. 5 comprises two stacks 31a and 31b of superimposed elongate armor tapes and an elongate support element 32 comprising a channel 33, and two stacks 31a and 31b of superimposed elongate armor tapes are arranged in the channel 33 of the elongate support element 32. The elongate reinforcement element 30 further comprises a lid 34 for the elongate support element 32. The lid 34 is applied above the channel 33 to fully or partly encasing the stacks 31a, 31a of superimposed elongate armor strips in the channel 33. The lid 34 is preferably fixed or bonded to the elongate support element 32 with an adhesive fixation as indicated with the reference number 35. The inner bottom surface 26 and/or the inner side surfaces 27a, 27b is for example covered with a not shown metal lining as described.

Figure 6:
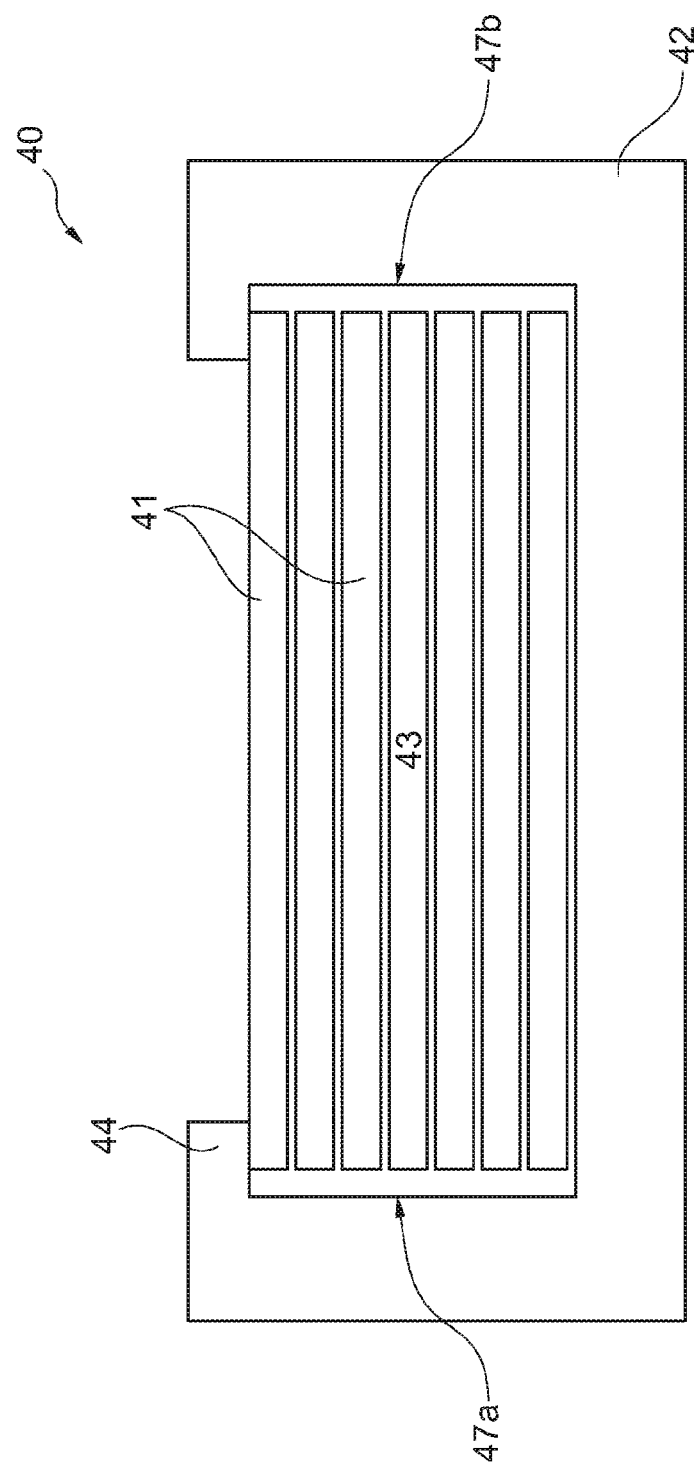
FIG. 6 is a cross-sectional view of yet another elongate reinforcement element of the invention with an elongate support element comprising a channel and a flange for withholding elongate armor strips in the channel.

FIG. 6 shows another elongate reinforcement element 40 comprising a plurality of superimposed elongate armor tapes 41 and an elongate support element 42 comprising a channel 43. The plurality of superimposed elongate armor tapes 41 are arranged in the channel 43 of the elongate support element 42. The channel 43 of the elongate support element 42 comprises two opposite side sections with inner side surfaces 47a, 47b. The inner side surfaces 47a, 47b are provided with respective flanges 44 configured to withhold the elongate armor tapes 41 in the channel 43.

Figure 7:
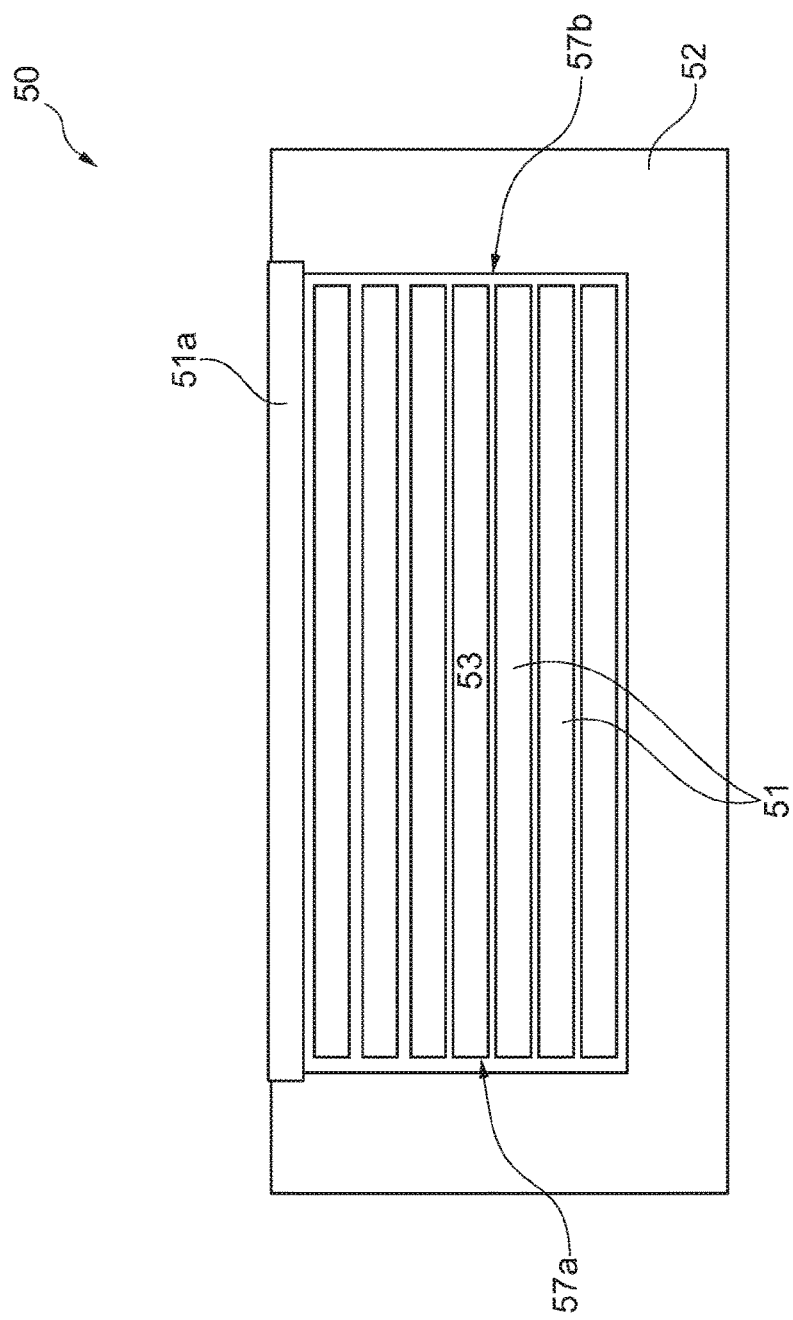
FIG. 7 is a cross-sectional view of yet another elongate reinforcement element of the invention comprising superimposed elongate armor strips in the form of tapes where the uppermost tape provides a lid.

FIG. 7 shows another elongate reinforcement element 50 comprising a plurality of superimposed elongate armor tapes 51 and an elongate support element 52 comprising a channel 53. The plurality of superimposed elongate armor tapes 51 are arranged in the channel 53 of the elongate support element 52. The channel 53 of the elongate support element 52 comprises two opposite side sections with inner side surfaces 57a, 57b. The uppermost elongate armor tape 51a is withheld in the channel 53 by being in tension between the inner side surfaces 57a, 57b of the opposite side sections. Thereby the uppermost elongate armor tape 51a functions as a lid for the elongate support element 52 to fully encase the other elongate armor tapes 51 in the channel 53.

Figure 8:
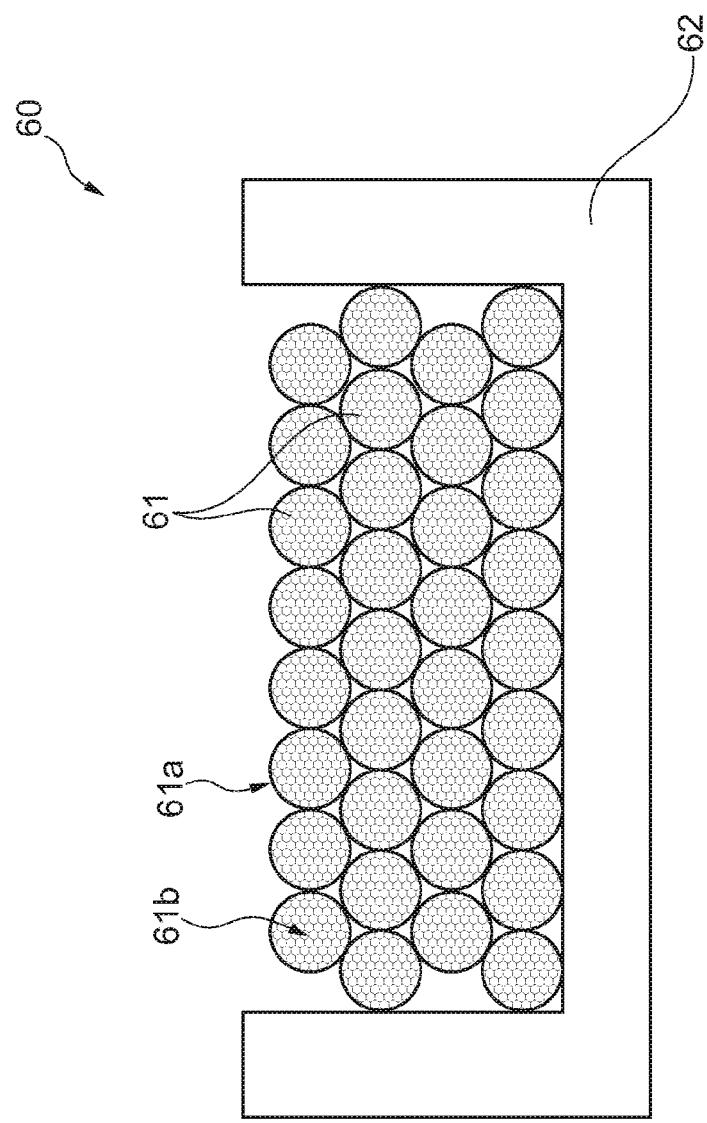
FIG. 8 is a cross-sectional view of yet another elongate reinforcement element of the invention comprising superimposed elongate armor strips having circular cross-sectional shape.

The elongate reinforcement element 60 shown in FIG. 8 comprises a plurality of superimposed elongate armor strips 61 and an elongate support element 62 comprising a channel 63. The plurality of superimposed elongate armor strips 61 are arranged in the channel 63 of the elongate support element 62. The elongate armor strips 61 have a round cross sectional shape. The respective round elongate armor strips 61 comprise a core 61b of fibre reinforced thermoset polymer covered with a coating 61a of a thermoplastic polymer.

After the elongate reinforcement element 60 has been helically wound to the pipe or simultaneously with the winding thereof the elongate armor strips 61 can be heated e.g. with infrared radiation to molten the thermoplastic polymer coating 61a, such that the respective elongate armor strips 61 will be bonded to each other. Simultaneously the elongate armor strips 61 will be slightly deformed from their round cross-sectional shape to form a hexagonal pattern.

Figure 9:
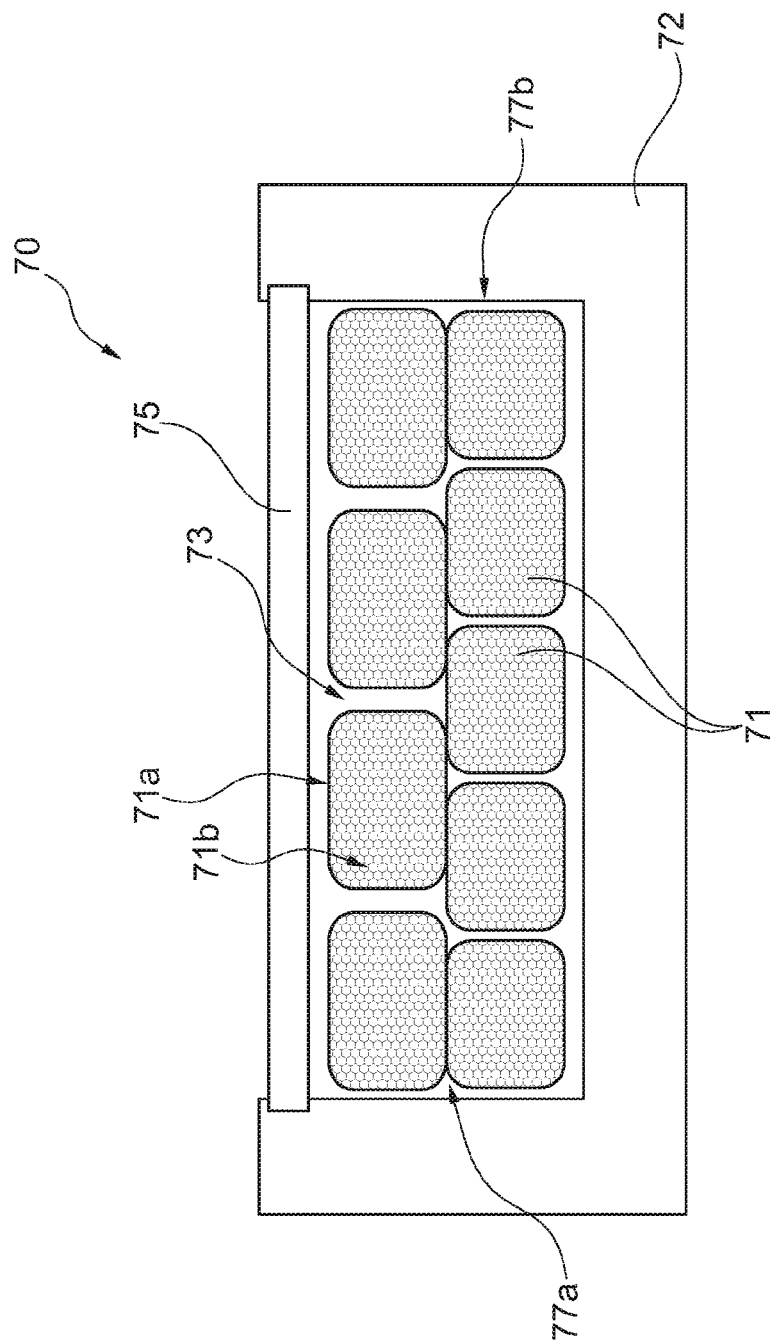
FIG. 9 is a cross-sectional view of yet another elongate reinforcement element of the invention comprising superimposed elongate armor strips having square cross-sectional shape.

FIG. 9 shows another elongate reinforcement element 70 comprising a plurality of superimposed elongate armor strips 71 with respectively square or rectangular cross sectional shape. The plurality of elongate armor strips 71 are arranged in the channel 73 of the elongate support element 72. The channel 73 of the elongate support element 72 comprises two opposite side sections with inner side surfaces 77a, 77b. The elongate reinforcement element 70 further comprises an uppermost elongate armor tape 74. The uppermost elongate armor tape 74 is withheld in the channel 73 by being in tension between the inner side surfaces 77a, 77b of the opposite side sections. Thereby the uppermost elongate armor tape 74 functions as a lid for the elongate support element 72 to fully encase the superimposed elongate armor strips 71 in the channel 73. The superimposed elongate armor strips 71 comprise a core 71b of fibre reinforced thermoset polymer covered with a coating 71a of a thermoplastic polymer.

After the elongate reinforcement element 70 has been helically wound to the pipe or simultaneously with the winding thereof the elongate armor strips 71 can be heated to molten the thermoplastic polymer coating 71a, such that the respective elongate armor strips 71 will be bonded to each other.

Figure 10:
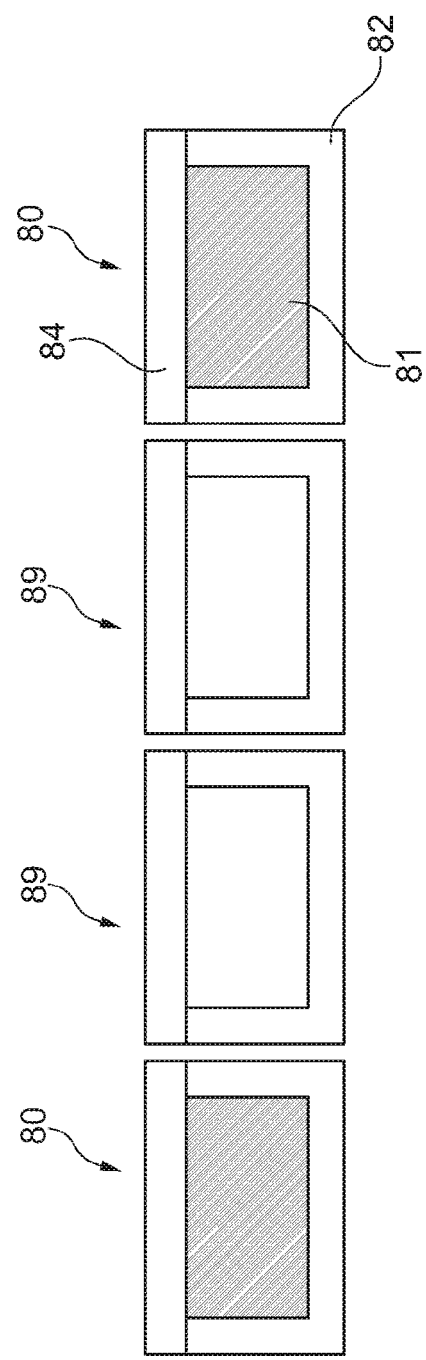
FIG. 10 is a cross-sectional and schematic view of a plurality of reinforcement elements and elongate blind elements as they are applied on the flexible pipe.

FIG. 10 is an illustration of a plurality of reinforcement elements 80 and elongate blind elements 89 as they are applied on the flexible pipe. Each of the reinforcement elements 80 comprises a plurality of superimposed elongate armor tapes 81 and an elongate support element 82 with a channel and the plurality of superimposed elongate armor tapes 81 arranged in the channel. Each elongate reinforcement element 80 further comprises a lid 84 for the elongate support element 82. The elongate blind elements 89 are similar to the reinforcement elements 80, with the difference that the elongate blind elements 89 do not comprise any elongate armor strips. The reinforcement elements 80 and the elongate blind elements 89 are helically wound in side-by-side relation onto a pipe. The respective number of reinforcement elements 80 and elongate blind elements 89 can be selected in relation to the total required strength for the armor layer which is preferably a tensile armor layer. The reinforcement elements 80 and elongate blind elements 89 are preferably equally distributed around the circumference of the pipe e.g. such that the order of elongate elements is for example reinforcement element, reinforcement element, blind element, blind element, reinforcement element, reinforcement element, blind element, blind element or reinforcement element, reinforcement element, blind element, reinforcement element, reinforcement element, blind element . . . .

The elongate blind elements 89 are hollow.

Figure 11:
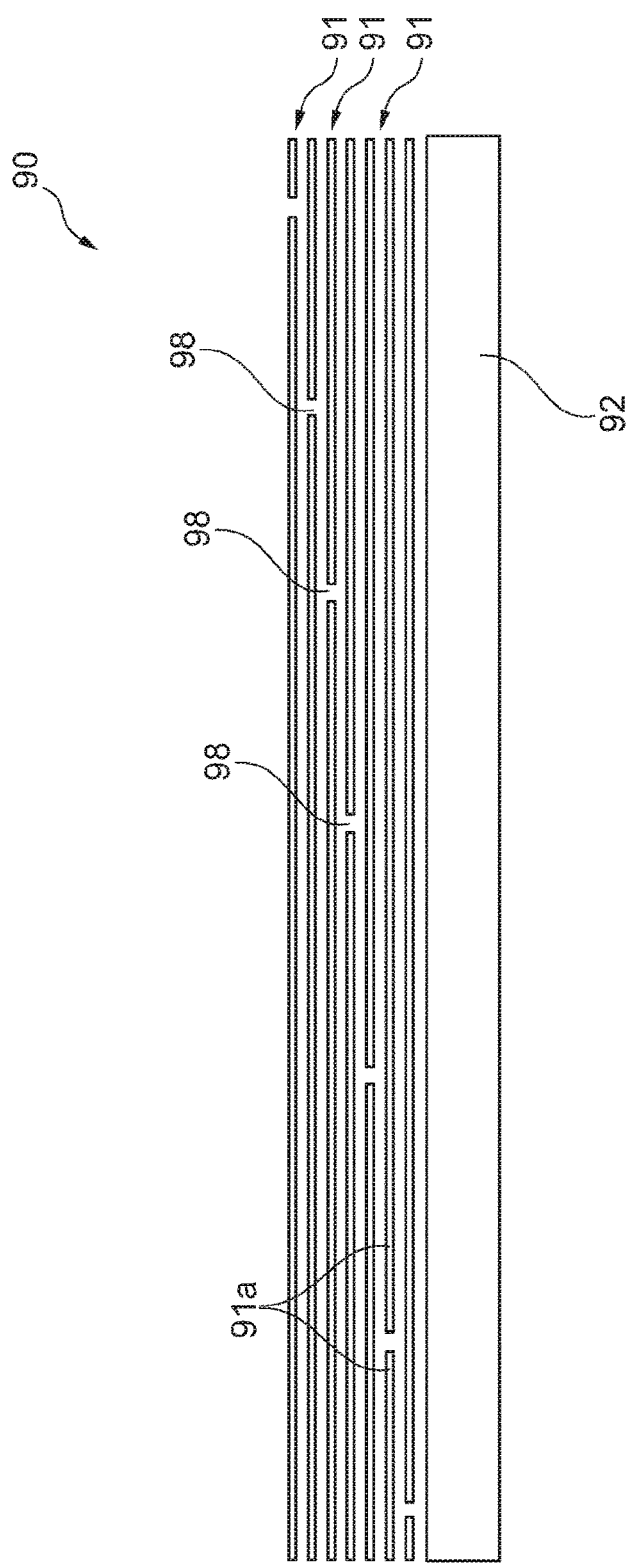
FIG. 11 is a cross-sectional side view of an elongate reinforcement element of the invention comprising superimposed elongate armor strips in form of elongate armor layers of tapes.

FIG. 11 is a cross-sectional side view of an elongate reinforcement element 90 comprising an elongate support element 92 with a channel containing superimposed elongate armor strips in form of elongate armor layers of tapes 91 also referred to as strip layers 91. The strip layers 91 consist of several elongate armor strip sections 91a applied in extension of each other, thereby providing strip replacement locations 98 where an elongate armor strip section 91a replaces another elongate armor strip section 91a by being applied in extension thereof. The replacement locations 98 of the elongate armor strip layers 91 are displaced with respect to each other along the length of the elongate reinforcement element 90.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

What is claimed is:

1. An elongate reinforcement element for reinforcing an unbonded flexible pipe, the reinforcement element comprises a plurality of elongate armor strips and an elongate support element comprising an elongate body, a channel defined by the elongate body, and an opening through a side of the elongate body that extends longitudinally along a side of the channel, wherein the plurality of elongate armor strips are arranged to be superimposed in the channel of the elongate support element, and wherein the plurality of superimposed elongate armor strips are displaceable in relation to each other upon bending of the elongate reinforcement element.

2. The elongate reinforcement element as claimed in claim 1, wherein the superimposed elongate armor strips are in the form of superimposed elongate armor tapes.

3. The elongate reinforcement element as claimed in claim 1, wherein the elongate armor strips comprise composite elongate armor strips comprising fibres embedded in an at least partly cured polymer matrix.

4. The elongate reinforcement element as claimed in claim 3, wherein the composite elongate armor strips comprise fibres selected from basalt fibres, polypropylene fibres, carbon fibres, glass fibres, aramid fibres, steel fibres, polyethylene fibres, mineral fibres and/or mixtures comprising at least one of the foregoing fibres.

5. The elongate reinforcement element as claimed in claim 3, wherein the composite elongate armor strips have a longitudinal direction along the channel and the predominant amount by weight of the fibres are orientated in the longitudinal direction of the composite elongate armor strips.

6. The elongate reinforcement element as claimed in claim 3, wherein at least about 60% by weight of the fibres are in the form of continuous fibres selected from continuous filaments, continuous yarns, continuous rovings or combinations thereof.

7. The elongate reinforcement element as claimed in claim 3, wherein the polymer matrix of the composite elongate armor strips comprises a thermoset polymer selected from epoxy resins, vinyl-epoxy-ester resins, polyester resins, polyimide resins, bis-maleimide resins, cyanate ester resins, vinyl resins, benzoxazine resins, benzocyclobutene resins, or mixtures comprising at least one of the forgoing thermoset polymers.

8. The elongate reinforcement element as claimed in claim 3, wherein the polymer matrix of the composite elongate armor strips comprises a thermoplastic polymer, such as polyolefin, polyamide, polyimide, polyamide-imide, polyester, polyurethane, polyacrylate or mixtures comprising at least one of the forgoing thermoplastic polymers.

9. The elongate reinforcement element as claimed in claim 1, wherein the respective armor strips have a length along its longitudinal direction, a width and a thickness of from about 100:1 to about 5:1, wherein the width of the respective armor strips of the superimposed elongate armor strips is substantially identical and the elongate armor strips are in the form of tapes.

10. The elongate reinforcement element as claimed in claim 1, wherein the channel of the elongate support element comprises a bottom section with an inner bottom surface and two opposite side sections with inner side surfaces, the channel has a width parallel to the width of the armor strips and a height perpendicular to the width of the armor strips, wherein the height of the channel is at least about the sum of the thickness of the superimposed elongate armor strips.

11. The elongate reinforcement element as claimed in claim 10, wherein the width of the channel and the width(s) of the armor strips of the superimposed elongate armor strips are selected such that at least one of the armor strips is/are withheld in the channel by protrusions from the inner side surface(s).

12. The elongate reinforcement element as claimed in claim 1, wherein the elongate support element is of polymer material and the elongate support element is an extruded elongate support.

13. The elongate reinforcement element as claimed in claim 1, wherein the elongate support element is of an elastomer material.

14. The elongate reinforcement element as claimed in claim 1 further comprising a separable lid for the elongate support element, the lid is fixed or bonded to the elongate support element across the opening to fully or partly encase the superimposed elongate armor strips within the channel.

15. A method of producing an elongate reinforcement element as claimed in claim 1, the method comprising
providing an elongate support element with a length, the elongate support element comprising a channel along its length;
providing a plurality of elongate armor strips; and
applying the plurality of elongate armor strips in the channel of the elongate support element such that the plurality of armor strips are superimposed in the channel.

16. The method of claim 15, wherein the elongate armor strips comprise composite elongate armor strips of fibres embedded in a polymer matrix, the method comprises embedding the fibres in the polymer matrix by a pultrusion process.

17. The method of claim 15, wherein the elongate armor strips are in the form of strip layers wherein at least one strip layer consists of several elongate armor strip sections and the method comprising applying the elongate armor strip sections in extension of each other thereby providing a strip replacement location where an elongate armor strip section replaces another by being applied in extension thereof.

18. The method of claim 15, further comprising providing a separable lid for the elongate support element, and fixing or bonding the lid to the elongate support element across the opening to fully or partly encase the superimposed elongate armor strips within the channel.

19. An unbonded flexible pipe comprising an innermost sealing sheath defining a bore and a length axis of the pipe and at least one armor layer comprising at least one helically wound elongate reinforcement element comprising a plurality of superimposed elongate armor strips and an elongate support element comprising an elongate body, a channel defined by the elongate body, and an opening through a side of the elongate body that extends longitudinally along a side of the channel, wherein the plurality of elongate armor strips are arranged in the channel of the elongate support element, and wherein the plurality of superimposed elongate armor strips are displaceable in relation to each other upon bending of the elongate reinforcement element.

20. The unbonded flexible pipe of claim 19, wherein the unbonded flexible pipe comprises a pressure armor layer comprising said elongate reinforcement element(s), the elongate reinforcement element(s) being helically wound with a winding angle to the length axis of the pipe which is about 70 degrees or more.

21. The unbonded flexible pipe of claim 19, wherein the unbonded flexible pipe comprises at least one tensile armor layer comprising said elongate reinforcement element(s), the elongate reinforcement element(s) being helically wound with a winding angle to the length axis of the pipe which is about 45 degrees or less.

22. The unbonded flexible pipe of claim 21, wherein the at least one tensile armor layer comprises a plurality of said elongate reinforcement elements, the tensile armor layer further comprises at least one elongate blind element, the elongate reinforcement elements and the at least one elongate blind element being helically wound in a side by side relation.

23. The elongate reinforcement element as claimed in claim 1, wherein the elongate body has a substantially U-shaped cross-section.

24. The unbonded flexible pipe of claim 19, wherein the elongate body has a substantially U-shaped cross-section.

* * * * *